(12) United States Patent
Testar

(10) Patent No.: US 9,024,809 B2
(45) Date of Patent: May 5, 2015

(54) OBJECT DETECTION SYSTEM AND METHOD

(75) Inventor: Miquel Testar, Stuttgart (DE)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 13/407,289

(22) Filed: Feb. 28, 2012

(65) Prior Publication Data

US 2012/0235854 A1 Sep. 20, 2012

(30) Foreign Application Priority Data

Mar. 17, 2011 (EP) .................................... 11158702

(51) Int. Cl.
G01S 13/58 (2006.01)
G01S 13/34 (2006.01)
G01S 7/35 (2006.01)

(52) U.S. Cl.
CPC ............ G01S 13/584 (2013.01); G01S 13/343 (2013.01); G01S 13/345 (2013.01); G01S 7/35 (2013.01)

(58) Field of Classification Search
CPC ... G01S 13/343; G01S 13/345; G01S 13/584; G01S 7/35
USPC ......................................... 342/109, 128, 200
See application file for complete search history.

(56) References Cited

U.S. PATENT DOCUMENTS

| | | | |
|---|---|---|---|
| 5,349,358 A | | 9/1994 | Canal |
| 5,757,311 A | * | 5/1998 | Voyce ............................ 342/130 |
| 5,963,163 A | * | 10/1999 | Kemkemian et al. ......... 342/109 |
| 6,606,052 B1 | | 8/2003 | Miyahara |
| 7,034,743 B2 | * | 4/2006 | Nakanishi et al. ............. 342/128 |
| 7,071,868 B2 | | 7/2006 | Woodington et al. |
| 7,312,745 B2 | * | 12/2007 | Ishii et al. ....................... 342/109 |
| 7,385,550 B2 | * | 6/2008 | Winter et al. .................... 342/70 |
| 8,077,075 B2 | * | 12/2011 | Randler et al. .................. 342/70 |
| 8,085,184 B2 | * | 12/2011 | Takabayashi et al. ........... 342/70 |
| 2004/0041727 A1 | * | 3/2004 | Ishii et al. ...................... 342/109 |
| 2008/0042895 A1 | | 2/2008 | Inaba |

(Continued)

FOREIGN PATENT DOCUMENTS

| | | |
|---|---|---|
| EP | 1 918 736 A2 | 5/2008 |
| EP | 1 918 736 A3 | 5/2008 |
| WO | WO 2010/012801 A1 | 2/2010 |

OTHER PUBLICATIONS

Extended European Search Report issued Jun. 19, 2012 in Patent Application No. 12158269.6.

(Continued)

Primary Examiner — Matthew M Barker
(74) Attorney, Agent, or Firm — Oblon, McClelland, Maier & Neustadt, L.L.P.

(57) ABSTRACT

The present invention relates to an object detection system and method for determining range and velocity of a target object by transmitting a frequency modulated continuous wave transmission signal and receiving transmission signal reflections of the transmission signal from the target object as a reception signal. Each modulation block of the transmission signal comprises a number of first type chirps, each first type chirp having a first slope, and a number of second type chirps, each second type chirp having a second slope different from the first slope. Two consecutive chirps of the same type have a frequency offset Δ mixed signal based on the transmission signal and the reception signal and using the first type chirps and the second type chirps is processed, in order to determine the range and velocity of the target object.

23 Claims, 9 Drawing Sheets

(56) References Cited

U.S. PATENT DOCUMENTS

| | | | |
|---|---|---|---|
| 2008/0100500 A1 | 5/2008 | Kondoh | |
| 2010/0245154 A1 | 9/2010 | Szajnowski | |
| 2010/0289692 A1 | 11/2010 | Winkler | |
| 2012/0112951 A1* | 5/2012 | Nakanishi et al. | 342/107 |
| 2012/0274501 A1* | 11/2012 | Kuwahara et al. | 342/147 |

OTHER PUBLICATIONS

M. Skolnik, "Radar Handbook", Second Edition, McGrawHill, 1970, 26 Pages.

Graham M. Brooker, "Understanding Millimetre Wave FMCW Radars", 1st International Conference on Sensing Technology, Nov. 21-23, 2005, pp. 152-157.

Graham Brooker, "Long-Range Imaging Radar for Autonomous Navigation", Ph.D Thesis, University of Sydney, 2005, 180 pages.

Andrzej Wojtkiewicz, et al., "Two-dimensional signal processing in FMCW radars", in Proc. XX KKTOiUE, Kolobrzeg, Poland, 1997, pp. 475-480.

M. Musa, et al., "Ambiguity elimination in HF FMCW radar systems", IEE Proc.-Radar, Sonar Navig., vol. 147, No. 4, Aug. 2000, pp. 182-188.

S. Salous, et al., "Architecture for advanced FMCW sounding", Int. J. Electronics, vol. 84, No. 5, 1998, pp. 429-436.

A. W. V. Poole, "Advanced sounding 1. The FMCW alternative", Radio Science, vol. 20, No. 6, 1985, pp. 1609-1616.

Andreas Haderer, et al., "Precise Radial Velocity Estimation Using an FMCW Radar", European Radar Conference, 2010, 4 pages.

Volker Winkler, "Novel Waveform Generation Principle for short-range FMCW-Radars", GeMiC, 2009, 4 pages.

\* cited by examiner

OBJECT DETECTION SYSTEM AND METHOD

CROSS-REFERENCE TO RELATED APPLICATIONS

The present application claims priority of European patent application 11 158 702.8 filed on Mar. 17, 2011.

FIELD OF INVENTION

The present invention relates to an object detection system and method for determining range and velocity of a target object by transmitting a frequency modulated continuous wave (FMCW) transmission signal and receiving transmission signal reflections of the transmission signal from the target object as a reception signal, in particular to for higher frequency signals. The present invention also relates to a computer program and a computer readable non-transitory medium for implementing such a method.

BACKGROUND OF THE INVENTION

Object detection systems for determining range and velocity of a target object are also known as radar systems (radio detection and ranging). Frequency modulated continuous wave (FMCW) object detection or radar systems use a transmission signal with linearly increasing frequency. FMCW systems permit to obtain range and velocity of a target object simultaneously. Range can be obtained with the detection of the frequency shift between the transmission signal and the reception signal. Velocity can be obtained by detecting the Doppler shift. When using higher frequency signals, the Doppler shift increases, but also the maximum unambiguously detectable velocity (speed) decreases.

U.S. Pat. No. 6,606,052 B1 discloses a method and an apparatus for multiple object detection by automotive FMCW radars providing distance and relative velocity information. A two chirp frequency sweep with small slope difference is utilized and, since the difference is small, the distance information can be obtained by automatically eliminating the Doppler frequency.

US 2010/0289692 A1 discloses a radar system and method using an electromagnetic wave having a period comprising a number of consecutive ramps. A first ramp in the period is transmitted over a first portion of a frequency range, and a second ramp in the period is transmitted over a second portion of the frequency range that differs from the first portion. The second ramp is offset by a frequency shift relative to the first ramp.

BRIEF SUMMARY OF INVENTION

It is an object of the present invention to provide an object detection system and method in which the maximum detectable unambiguous velocity (speed) is increased without reducing the detection update rate (refresh rate). It is a further object of the present invention to provide a computer program and a computer readable non-transitory medium for implementing such a method.

According to an aspect of the present invention there is provided an object detection system for determining range and velocity of a target object by transmitting a frequency modulated continuous wave (FMCW) transmission signal and receiving transmission signal reflections of the transmission signal from the target object as a reception signal. The system comprises a signal generator for generating the FMCW transmission signal. The transmission signal has multiple consecutive modulation blocks Each modulation block comprises a number of first type chirps, each first type chirp having a first slope, and a number of second type chirps, each second type chirp having a second slope different from the first slope. Two consecutive chirps of the same type have a frequency offset. The system further comprises a signal processing unit for processing a mixed signal based on the transmission signal and the reception signal and using the first type chirps and the second type chirps, in order to determine the range and velocity of the target object.

According to a further aspect of the present invention there is provided an object detection method for determining range and velocity of a target object by transmitting a frequency modulated continuous wave (FMCW) transmission signal and receiving transmission signal reflections of the transmission signal from the target object as a reception signal. The method comprises the step of generating the FMCW transmission signal. The transmission signal has multiple consecutive identical modulation blocks Each modulation block comprises a number of first type chirps, each first type chirp having a first slope, and number of second type chirps, each second type chirp having a second slope different from the first slope. Two consecutive chirps of the same type have a frequency offset. The method further comprises the step of processing a mixed signal based on the transmission signal and the reception signal and using the first type chirps and the second type chirps, in order to determine the range and velocity of the target object.

According to still further aspects a computer program comprising program means for causing a computer to carry out the steps of the method according to the present invention, when said computer program is carried out on a computer, as well as a computer readable non-transitory medium having instructions stored thereon which, when carried out on a computer, cause the computer to perform the steps of the method according to the present invention are provided.

Preferred embodiments of the invention are defined in the dependent claims. It shall be understood that the claimed method, the claimed computer program and the claimed computer readable medium have similar and/or identical preferred embodiments as the claimed system and as defined in the dependent claims.

The present invention is based on the idea to combine, on the one hand, chirp slope diversity, which means to use different types of chirps having different slopes, and, on the other hand, partial frequency excursion, which means that there is a frequency offset between chirps of the same type. Both types of chirps are used for signal processing. Thus, on the one hand, it is achieved, that the maximum unambiguous detectable velocity (speed) is increased. This is particularly allows a better unambiguous distinction between two targets at the same range, in particular when using higher frequency signals, such as in a short or mid range radar system. On the other hand, the measurement time is reduced, in particular, the time needed for one modulation block is reduced. Thus, the detection update rate is increased.

BRIEF DESCRIPTION OF DRAWINGS

These and other aspects of the present invention will be apparent from and explained in more detail below with reference to the embodiments described hereinafter. In the following drawings

FIG. 6 shows a diagram showing the detections of a target object with increasing speed using the FMCW transmission signal of FIG. 5 or FIG. 5a;

FIG. 7 shows a diagram showing multiple detections of a target object with random speed using the FMCW transmission signal of FIG. 5 or FIG. 5a;

DETAILED DESCRIPTION OF THE INVENTION

Figure 1:
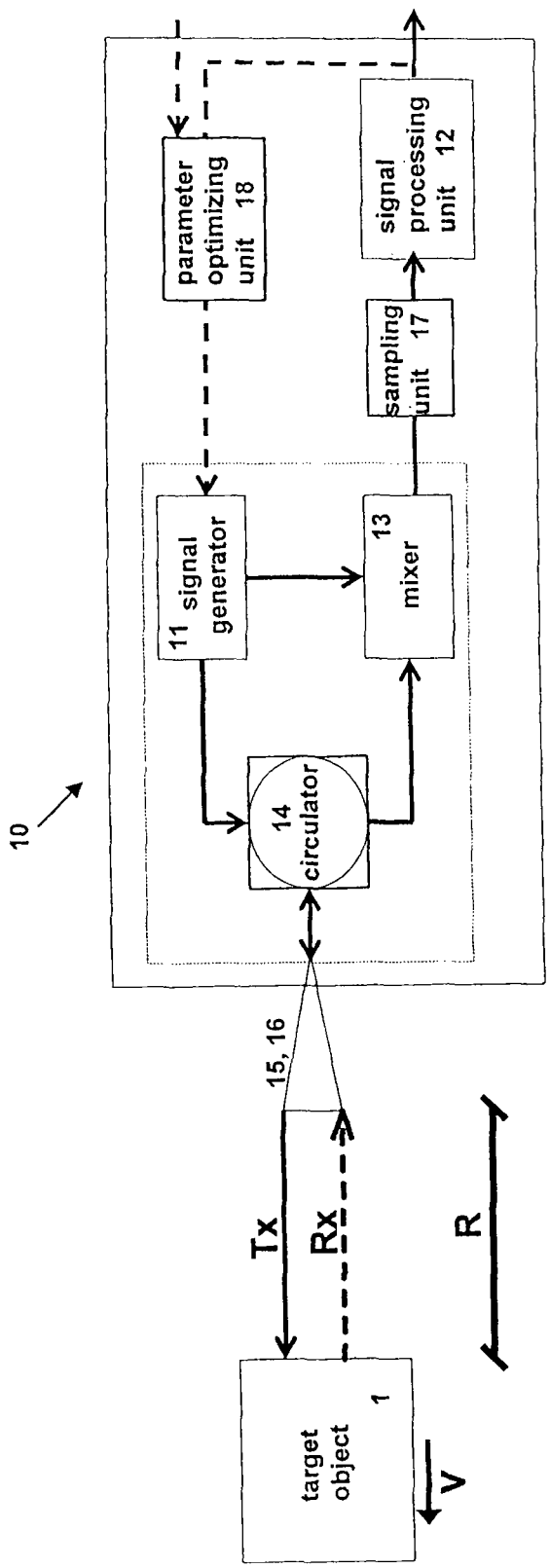
FIG. 1 shows a schematic diagram of an object detection system according to an embodiment.

FIG. 1 shows a schematic diagram of an object detection system 10 according to an embodiment. The object detection system 10 determines a range R and velocity v of a target object 1 by transmitting a frequency modulated continuous wave (in the following FMCW) transmission signal Tx and receiving transmission signal reflections of the transmission signal Tx from the target object 1 as a reception signal Rx. The system can in particular be using higher frequency signals, such as in a short or mid range FMCW object detection or radar system. For example, a central frequency $f_c$ of the transmission signal Tx can be at least 2 GHz, for example at least 40 GHz. In particular, the central frequency $f_c$ can be at least 100 GHz, for example at least 1 THz. Thus, Tera-hertz frequencies or mm/sub-mm wavelengths can be used.

In the embodiment of FIG. 1, the object detection system comprises a transmitter antenna 15 for transmitting the FMCW transmission signal Tx and a receiver antenna 16 for receiving the reception signal Rx. The transmitter antenna 15 and/or receiver antenna 16 can be implemented in form of any suitable antenna or multiple antennas or an antenna array. For example, in the embodiment of FIG. 1 the transmitter antenna 15 and the receiver antenna 16 are implemented with a single transmitter and receiver antenna.

The object detection system 10 comprises a signal generator 11 for generating the FMCW transmission signal Tx. The objection detection system 10 further comprises a mixer 13 for generating a mixed signal based on the transmission signal Tx and the reception signal Rx. In the embodiment of FIG. 1, the object detection system 10 further comprises a circulator 14 for routing the transmission signal Tx and the reception signal Rx between the transmitter and receiver antenna 15, 16, the signal generator 11 and the mixer 13, since a single transmitter and receiver antenna is used in the embodiment of FIG. 1. As can be seen in FIG. 1, the transmission signal Tx is supplied to the mixer 13 by the signal generator 11 and the reception signal Rx is supplied to the mixer 13 by the circulator 14. Thus, the reception signal is mixed with the signal that is instantaneously transmitted. The resultant signal after the mixer has one component at double the central frequency $f_c$ of the transmission signal Tx and another one at the lower frequency domain. Within this component, the range R and velocity v information of the target object 1 can be extracted, as these are coded as frequency shifts. The range R is obtained using the frequency shift between the transmission signal Tx and the reception signal Rx, and the velocity v is obtained using the Doppler shift.

In general, a transmitter of the object detection system 10 can comprise the signal generator 11 and the transmitter antenna 15. A receiver of the object detection system 10 can comprise the receiver antenna 16 and the mixer 13. The transmitter and/or receiver can optionally further comprise analog filter(s) and/or amplifier(s). The same housing can be used for the transmitter and the receiver, thus forming a transceiver.

The object detection system further comprises a sampling unit 17 for sampling the mixed signal received from the mixer 13. Then, a signal processing unit 12 for processing the mixed and sampled signal determines the range R and velocity v information of the target object 1. Both the first type chirps and the second type chirps are, at least partly, used in the mixed and sampled signal for signal processing.

Figure 2:
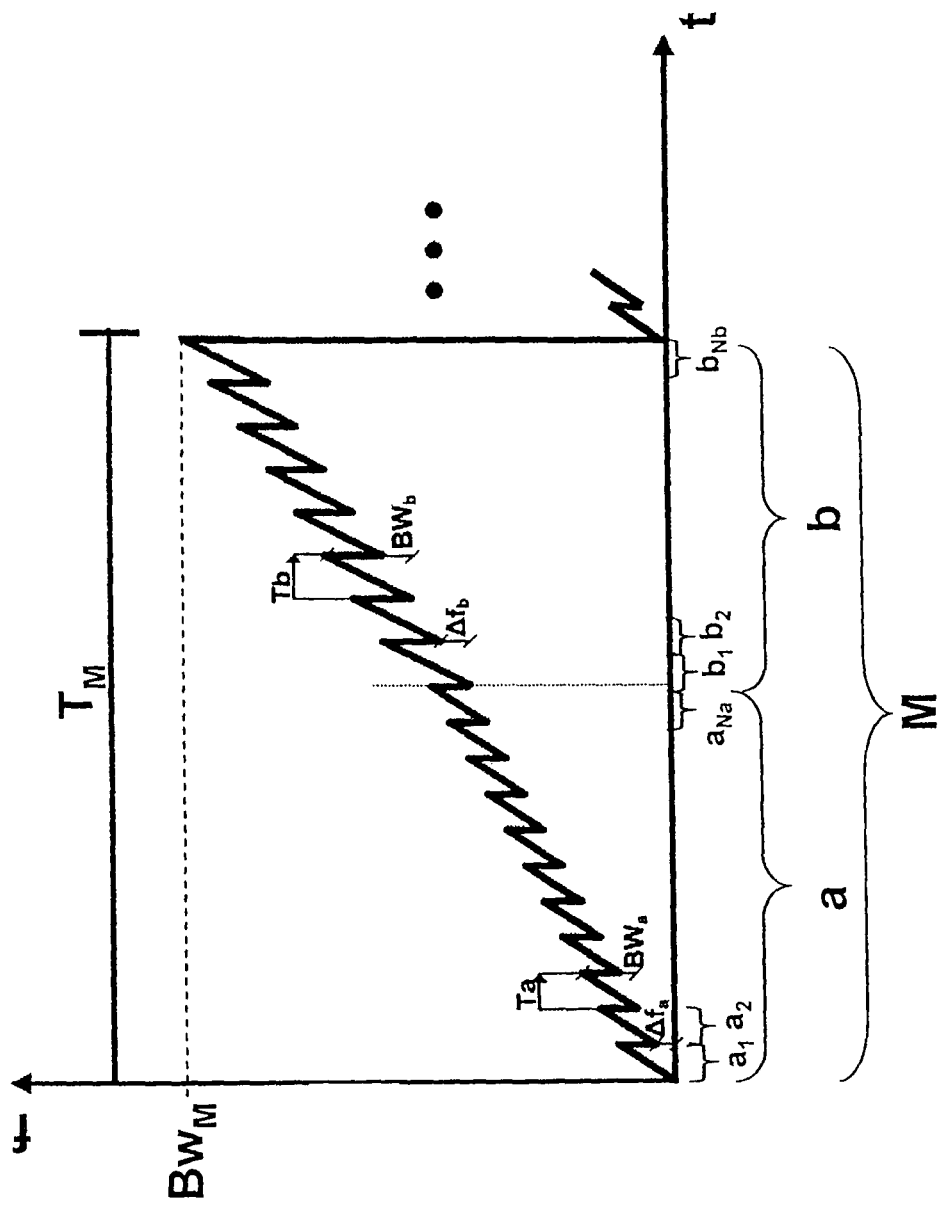
FIG. 2 shows a diagram of a FMCW transmission signal according to a first embodiment.
Figure 5:
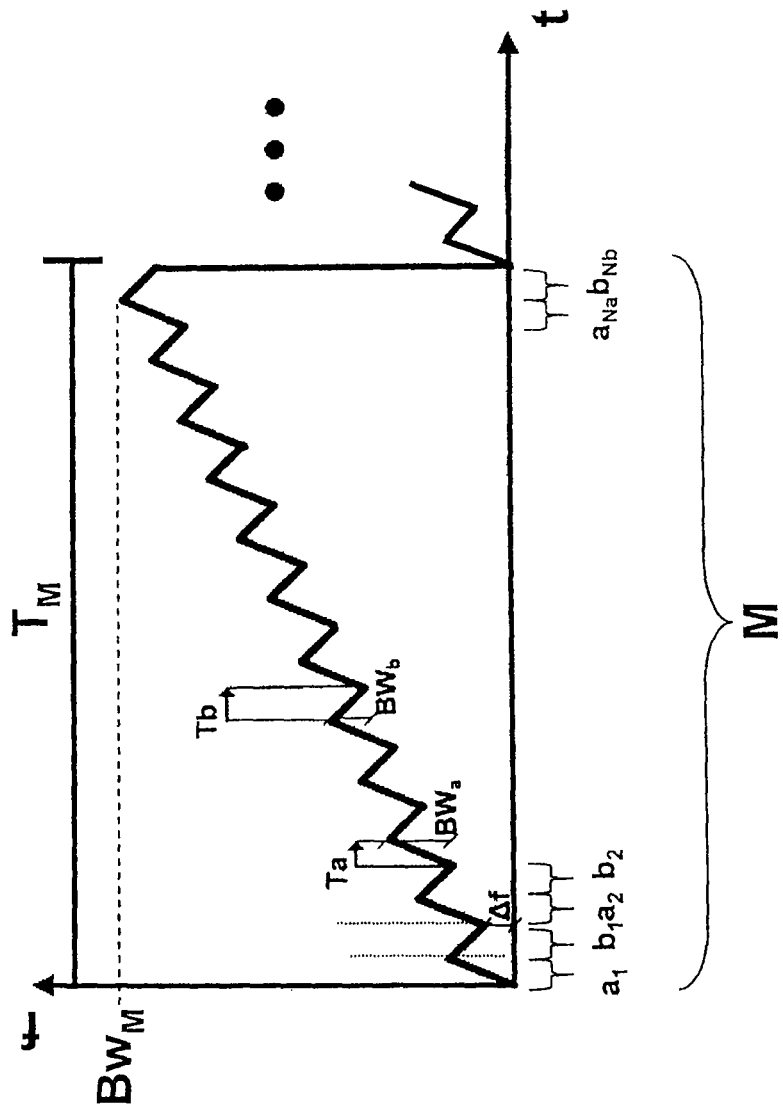
FIG. 5 shows a diagram of a FMCW transmission signal according to a second embodiment.

FIG. 2 shows a diagram of a FMCW transmission signal, or waveform, according to a first embodiment and FIG. 5 shows a diagram of a FMCW transmission signal, or waveform, according to a second embodiment. As can be seen from FIG. 2 and FIG. 5, the transmission signal Tx has multiple consecutive modulation blocks M. The modulation blocks are identical and have a block period $T_M$. The transmission signal Tx exploits the full frequency bandwidth $Bw_M$ over each block period $T_M$. For simplification, only the first modulation block M is entirely shown in FIG. 2 and FIG. 5. Each modulation block M comprises a number $N_a$ of first type chirps, each first type chirp having a first slope, and a number $N_b$ of second type chirps, each second type chirp having a second slope different from the first slope. Two consecutive chirps of the same type have a frequency offset $\Delta f$, $\Delta f_a$, $\Delta f_b$. A chirp is a portion of linearly increasing frequency. Each first type chirp has a first frequency bandwidth $Bw_a$ and a first duration $T_a$, the ratio of the first frequency bandwidth $Bw_a$ and the first duration $T_a$ defining the first slope. Each second type chirp has a second frequency bandwidth $Bw_b$ and a second duration $T_b$, the ratio of the second frequency bandwidth $Bw_b$ and the second duration $T_b$ defining the second slope. The slope of a chirp can also be called chirping rate.

The FMCW transmission signal according to the first embodiment shown in FIG. 2 will now be explained in more detail. Each modulation block M comprises a number $N_a$ of first type chirps $a_1, a_2, \ldots a_{Na}$. Each first type chirp $a_1, a_2, \ldots, a_{Na}$ has a first frequency bandwidth $Bw_a$ and a first duration $T_a$, their ratio defining a first slope. Two consecutive chirps of the first type have a frequency offset $\Delta f_a$. The first frequency bandwidth $Bw_a$ is a subrange of the full frequency bandwidth $Bw_M$, thus a partial frequency excursion (subband). In the embodiment of FIG. 2, each of the first type chirps $a_1, a_2, \ldots, a_{Na}$ forms a sawtooth. The number $N_a$ of first type chirps $a_1, a_2, \ldots, a_{Na}$, or sawteeth, forms a first portion a of the modulation block M.

Each modulation block M further comprises a number $N_b$ of second type chirps $b_1, b_2, \ldots, b_{Nb}$. Each second type chirp $b_1, b_2, \ldots, b_{Nb}$ has a second frequency bandwidth $B_{Wb}$ and a second duration $T_b$, their ratio defining a second slope. The second slope is different from the first slope. Two consecutive chirps of the second type have a frequency offset $\Delta f_b$. The second frequency bandwidth $Bw_b$ is a subrange of the full frequency bandwidth Bw, thus a partial frequency excursion (sub-band). Each of the second type chirps $b_1, b_2, \ldots, b_{Nb}$ forms a sawtooth. The number $N_b$ of second type chirps $b_1, b_2, \ldots, b_{Nb}$, or sawteeth, form a second portion b of the modulation block M. The number $N_b$ of second type chirps follows the number $N_a$ of first type chirps. Thus, the second portion b follows the first portion a. The number $N_a$ of first type chirps and the number $N_b$ of second type chirps are primes between them, which means that the number $N_a$ and the number $N_b$ do not have a common integer divisor other than 1.

The transmission signal or waveform of the first embodiment shown in FIG. 2 can be described as follows:

$$f(n,t) = \prod\left(\frac{n}{N_a} - \frac{1}{2}\right) \cdot \left[\prod\left(\frac{t}{T_a} - n + \frac{1}{2}\right) \cdot (\alpha_a \cdot t + (n-1) \cdot \Delta f_a)\right] +$$

$$\prod\left(\frac{n - N_a}{N_b} - \frac{1}{2}\right) \cdot \left[$$

$$\prod\left(\frac{t}{T_b} - n + \frac{1}{2}\right) \cdot (\alpha_b \cdot t + (n-1) \cdot \Delta f_b + N_a \cdot (\Delta f_a - \Delta f_b))\right]$$

$n = 1, 2, \ldots, N_a + 1, \ldots, N_a + N_b$ $t = 0 \to T_a (n = 1, 2, \ldots, N_a)$ $t = 0 \to T_b (n = N_a + 1, N_a + 2 \ldots N_a + N_b)$ $\alpha_a = Bw_a / T_a,$ $\alpha_b = Bw_b / T_b.$ Compared to a transmission signal using chirp rate diversity but with full frequency excursion instead of partial frequency excursions in one modulation block, the transmission signal described above allows an increase of the velocity detection update rate. Using the transmission signal described above, the velocity detection update rate becomes equal to the range detection update rate. If a transmission signal having full frequency excursion in one modulation block is used the time between range updates (inverse of the range detection update rate) equals the time of one full frequency excursion and the time between velocity updates (inverse of the velocity detection update rate) equals the modulation block period.

The FMCW transmission signal, or waveform, according to the second embodiment shown in FIG. 5 will now be explained in more detail. Each modulation block M comprises a number $N_a$ of first type chirps $a_1, a_2, \ldots, a_{Na}$. Each first type chirp $a_1, a_2, \ldots, a_{Na}$ has a first frequency bandwidth $Bw_a$, and a first duration $T_a$, their ratio defining a first slope. In the second embodiment shown in FIG. 5, the second slope is positive. Each modulation block M also has a number $N_b$ of second type chirps $b_1, b_2, \ldots, b_{Nb}$. Each second type chirp $b_1, b_2, \ldots, b_{Nb}$ has a second frequency bandwidth $Bw_b$ and a second duration $T_b$, their ratio defining a second slope. The second slope is different from the first slope. In the second embodiment shown in FIG. 5, the second slope is a negative. The first frequency bandwidth $Bw_a$ is a subrange of the full frequency bandwidth $Bw_M$, and the second frequency range $Bw_b$ is a subrange of the full frequency bandwidth $Bw_M$. Each second type chirp $b_1, b_2, \ldots, b_{Nb}$ having the negative slope directly follows a first type chirp $a_1, a_2, \ldots, a_{Na}$, having the positive slope. Therefore, each first type chirp $a_1, a_2, \ldots, a_{Na}$ and its directly following second type chirp $b_1, b_2, \ldots, b_{Nb}$ form a triangle. For example the first type chirp $a_1$ and its directly following second type chirp $b_1$ form a triangle. Two consecutive chirps of the first type $a_1, a_2, \ldots, a_{Na}$ have a frequency offset $\Delta f$ and two consecutive chirps of the second type $b_1, b_2, \ldots, b_{Nb}$ have the same frequency offset $\Delta f$.

In the second embodiment shown in FIG. 5, the number $N_a$ of first type chirps and the number $N_b$ of second type chirps are the same number N. The transmission signal of the second embodiment shown in FIG. 5 can be described as follows:

$$f(n,t) = \prod\left(n - \frac{1}{2}\right) \cdot \begin{bmatrix} \prod\left(\frac{t}{T_a} - \frac{1}{2}\right) \cdot (\alpha_a \cdot t + (n-1) \cdot \Delta f) + \\ \prod\left(\frac{t - T_a}{T_b} - \frac{1}{2}\right) \cdot \\ (-\alpha_b \cdot t + n \cdot (\Delta f + Bw_a) - \Delta f) \end{bmatrix}$$

$n = 1, 2, \ldots, N$ $t = 0 \to T_a + T_b (n = 1, 2 \ldots N)$

The advantage of the second embodiment in comparison to the first embodiment is that the maximum range resolution available is kept for the first chirp type, as the full available bandwidth is used. The drawback is an increase of the processing complexity, as non-consecutive signal parts have to be joined after the acquisition of a modulation block. However this increase of complexity is relatively small in comparison to the processing complexity of the described object detection method and system.

Figure 5A:
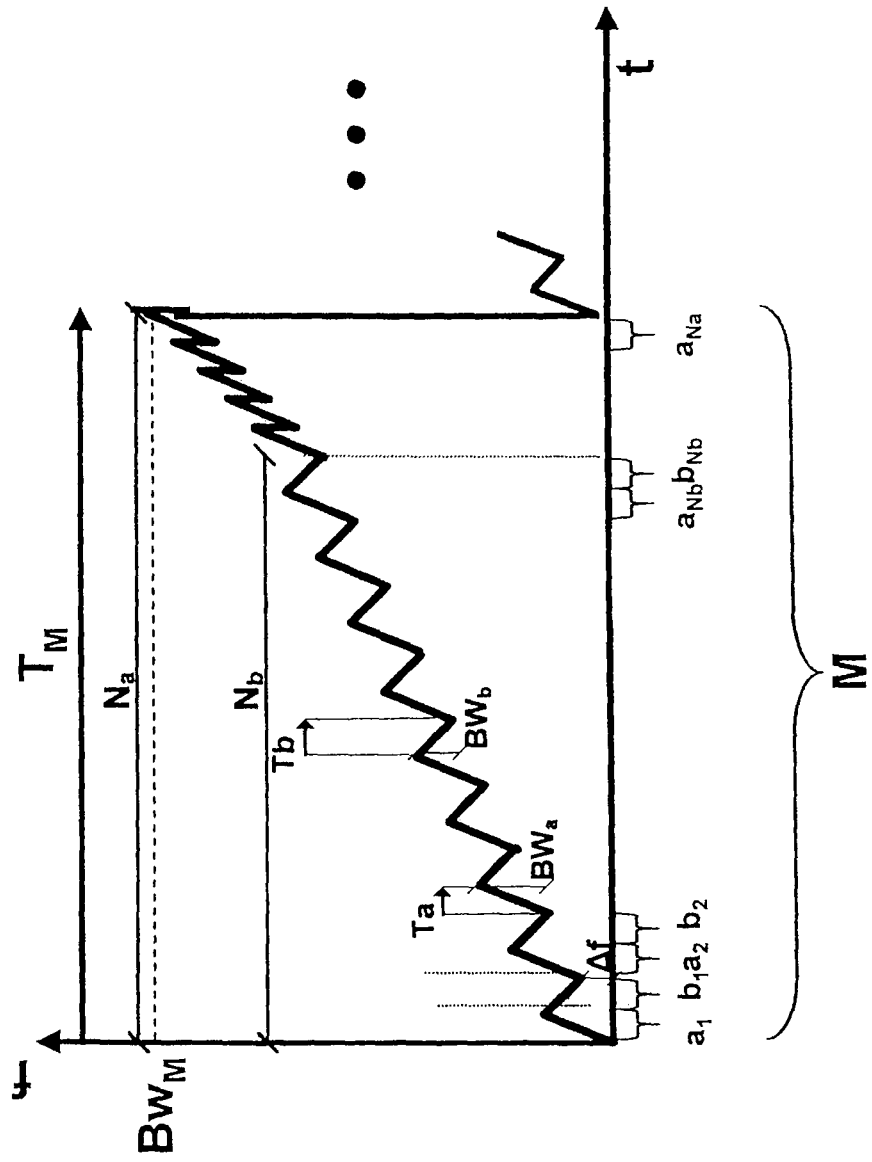
FIG. 5a shows a diagram of a FMCW transmission signal according to a variant of the second embodiment shown in FIG. 5.

FIG. 5a shows a diagram of a FMCW transmission signal according to a variant of the second embodiment shown in FIG. 5. In this variant, the number $N_a$ of first type chirps and the number $N_b$ of second type chirps are not the same number. The number $N_a$ of first type chirps and the number $N_b$ of second type chirps are primes between them. The number of first type chirps $N_a$ is bigger than the number of second type chirps $N_b$. Each second type chirp $b_1, b_2, \ldots, b_{Nb}$ having the negative slope directly follows a first type chirp $a_1, a_2, \ldots, a_{Nb}$. Thus, each of the first $N_b$ first type chirps $a_1, a_2, \ldots, a_{Nb}$ is directly followed by a second type chirp $b_1, b_2, \ldots, b_{Nb}$ to form a triangle. The subsequent $N_a - N_b$ first type chirps $a_{Nb}, a_{Nb+1}, \ldots, a_{Na}$ each form a sawtooth. Two consecutive chirps of the first type $a_1, a_2, \ldots, a_{Na}$ have a frequency offset $\Delta f$ and two consecutive chirps of the second type $b_1, b_2, \ldots, b_{Nb}$ have the same frequency offset $\Delta f$.

The transmission signal of this variant of the second embodiment (see FIG. 5a) can be described as follows:

$$f(n,t) = \prod\left(n - \frac{1}{2}\right) \cdot \begin{bmatrix} \prod\left(\frac{t}{T_a} - \frac{1}{2}\right) \cdot (\alpha_a \cdot t + (n-1) \cdot \Delta f) + \\ \prod\left(\frac{n}{N_b} - \frac{1}{2}\right) \cdot \prod\left(\frac{t - T_a}{T_b} - \frac{1}{2}\right) \cdot \\ (-\alpha_b \cdot t + n \cdot (\Delta f + Bw_a) - \Delta f) \end{bmatrix}$$

$N_a > N_b$ $n = 1, 2, \ldots, N_a$ $t = 0 \to T_a + T_b (n = 1, 2 \ldots, N_b)$ $t = 0 \to T_a (n = N_b + 1, N_b + 2 \ldots, N_a)$ The advantage of the variant shown in FIG. 5a, compared to FIG. 5, is that all of the transmission signal Tx is used for the signal processing. In the second embodiment shown in FIG. 5, the last $N'_a - N'_b$ second type chirps ($N'_a$ being the number of first type chirps used for signal processing, $N'_b$ being the number of second type chirps used for signal processing) are transmitted but not used for the signal processing and detection. Thus, only a part of the transmitted second type chirps is used for signal processing. In the variant of the second embodiment, shown in FIG. 5a, all of the second type chirps (and the first type chirps) that are transmitted are also used for the signal processing. Thus, this variant is more optimal.

Now, the signal processing of the mixed signal will be explained in more detail. A sampling unit 17 may sample the mixed signal with a sampling period $T_{sam}$. The first duration $T_a$ of each first type chirp is bigger than the sampling period $T_{sam}$ and the second duration $T_b$ of each second type chirp is bigger than the sampling period $T_{sam}$. This means that both the first type chirps and the second type chirps are sampled and signal processed. Thus, the mixed signal uses the first type chirps and the second type chirps.

The signal processing unit 12 is adapted to separate from the mixed and sampled signal a first signal component corresponding to the first type chirps and a second signal component corresponding to the second type chirps. The signal processing unit 12 is further adapted to process the first signal component and the second signal component independently from each other. The signal processing unit 12 is further adapted to determine an initial estimator of the range $R_{est}$ and an initial estimator of the velocity $v_{est}$ of the target object 1 by joining the information obtained from processing both signal components. These estimators can then be seeds in an iterative optimization algorithm used to determine a final value of the range R and a final value of the velocity v, thus decoupled range and velocity values.

This will now be explained in more detail. The signal processing unit 12 receives the mixed and sampled signal. First, a first signal component corresponding to the first type chirps and a second signal component corresponding to the second type chirps are separated from the mixed and sampled signal. In the first embodiment shown in FIG. 2, the separation can be done directly, as the first type chirps occur in the first portion a of each modulation block M. In the second embodiment shown in FIG. 5, each triangle has both types of chirps. The first parts (first type chirps), which are nonconsecutive, of the triangles are identified and joined together to create the first signal component, and the second parts (second type chirps), which are non-consecutive, of the triangles are joined together to create the second signal component.

In the variant of the second embodiment, referring to FIG. 5a, each of the first $N_b$ triangles has both types of chirps. The first parts (first type chirps) of the triangles are identified and joined together to create the first $N_b$ parts of the first signal component, and the second parts (second type chirps) of the triangles are joined together to create the second signal component. The last $N_a$-$N_b$ parts of the first signal component are directly joined to the first $N_b$ parts of the first signal component.

Next, the first signal component and the second signal component are processed independently from each other. A first two-dimensional Fourier transformation is applied to the first signal component and a second two-dimensional Fourier transformation is applied to the second signal component. Each of the two dimensional Fourier transformations has the following form:

$$X_{2D}(k, p) = e^{-j \cdot 4\pi f_c \cdot R/c} \cdot \left\{ \sum_{l=0}^{L-1} e^{-j \cdot 2\pi \left( \frac{2f_c v T_{Mini}}{Lc} + \frac{2 \cdot R \cdot Bw_{Mini}}{Lc} \right) l} \cdot \left[ \sum_{n=0}^{N-1} e^{-j \cdot 2\pi \left( \frac{2f_c v T_{Mini}}{c} + \frac{2R \cdot \Delta f}{c} \right) n} \cdot e^{-j \cdot 2\pi \left( \frac{n \cdot k}{N} \right)} \right] \cdot e^{-j \cdot 2\pi \left( \frac{l \cdot p}{L} \right)} \right\}$$

R: range of the target object.
$f_c$: central frequency.
v: velocity of the target object, defining the direction of the positive velocity as the direction towards the radar system.
$T_{sam}$: sampling period at reception.
$T_{Mini}$: period of a first type chirp or second type chirp ($T_a$, $T_b$).
$Bw_{Mini}$: bandwidth of a first type chirp or second type chirp ($Bw_a$, $Bw_b$)
$\Delta f$: frequency offset.
N: number of first type chirps or second type chirps per modulation block.
L: number of samples per first type chirp or second type chirp.

Then, a first peak corresponding to the target object 1 is detected in the first two-dimensional Fourier transformation, and a second peak corresponding to the target object 1 is detected in the second two-dimensional Fourier transformation. The peak of a target object 1 with range R and velocity v is detected at the following indices of the k-axis and the p-axis of the two-dimensional Fourier transformation:

$$\left( \frac{2v \cdot f_c \cdot T_{Mini}}{c} + \frac{2R \cdot \Delta f}{c} \right) - \left\| \frac{2v \cdot f_c \cdot T_{Mini}}{c} + \frac{2R \cdot \Delta f}{c} \right\| = \frac{k}{N}$$

$$\frac{N}{2} < k < \frac{N}{2}$$

$$\frac{2v \cdot f_c \cdot T_{Mini}}{L \cdot c} + \frac{2R \cdot Bw_{Mini}}{L \cdot c} = \frac{p}{L}$$

$$0 < p \leq L$$

In the above equation system of two equations with two unknowns is defined in which the analytical expression for the contribution of range R and velocity v for two axes k and p of detection is described. From the above equation system, the final range and velocity resolution along the k and p axis can be obtained as follows:

$$\Delta R_k = \frac{c}{2\Delta f \cdot N}$$

$$\Delta v_k = \frac{c}{2 f_c \cdot T_{Mini} \cdot N}$$

$$\Delta R_p = \frac{c}{2 Bw_{Mini}}$$

$$\Delta v_p = \frac{c}{2 f_c \cdot T_{Mini}}$$

Peak detection is performed in order to recognize the target objects. For example, a thresholding method can be used, wherein a target is recognized when its power exceeds a certain value. Alternatively, other suitable methods can be used, like for example a constant false alarm rate (CFAR) method, in which the detection is adapted dynamically.

Next, the first peak detected in the first signal portion and the second detected in the second signal portion can be linked. The position detected on the p-axis is used to link target objects. Depending on the maximum velocity allowed, the position on the p-axis for a first and a second peak can vary more or less. The maximum velocity allowed to be detected defines a tolerance $\epsilon$ that is used to link target objects in the p-axis:

$$\varepsilon = \frac{2 v_{max} \cdot f_c \cdot T_{Mini}}{c}$$

More than one target object can fall in the tolerance region for two different reasons. First, they can be placed at different range bins which distance between them is smaller than the defined tolerance. Second, they can be placed in the same range bin, but have different velocities. If more than one target falls in one tolerance region, the decoupled range R and speed v for all possible linking permutations which have to be computed (for example two in case of two target objects, six in case of three target objects or twenty four in case of four target objects). When all the possibilities are computed, those leading to an invalid result are eliminated. A permutation is defined as invalid if any of the velocities of the detected target object is higher than the maximum velocity allowed. Normally, an incorrect linking between the peaks of the two types leads to an invalid result. In this case, only one permutation remains as valid and the determined range and velocity of all the target objects inside one tolerance region for the valid permutation is delivered as a result. If more than one permutation is found as valid, the range and velocity of the targets inside one tolerance region can not be delivered as result. Slight variations of the target object's range and velocity in subsequent modulation blocks, inside the tolerance region where more than one valid permutation was found, may lead to obtaining a single valid permutation. Slight variations of the waveform parameters in subsequent modulation blocks may lead to obtaining a single valid permutation for the target objects, inside the tolerance region where more than one valid permutation was found.

Now, the range $R_{est}$ and velocity $v_{est}$ of the target object 1 can be estimated using the first peak and the second peak. After the object targets have been detected and linked, an initial estimator of the range and velocity is determined. If the first duration $T_a$ and the second duration $T_b$ are set to be equal, the system of equations is overdetermined and using the position of the peak for every target object in the p-axis for both the first two-dimensional Fourier transformation and the second two-dimensional Fourier transformation. Additionally the number of times that either the maximum detectable velocity or the zero velocity are overcome with a single type of chirp detection $n_{Over}$ is calculated, this value is used in an iterative optimization algorithm to obtain the final values of the range and velocity:

$$\frac{2v \cdot f_c \cdot T_{Mini}}{c} + \frac{2R \cdot Bw_a}{c} = p_a$$

$$\frac{2v \cdot f_c \cdot T_{Mini}}{c} + \frac{2R \cdot Bw_b}{c} = p_b$$

$$R_{est} = \frac{c}{2} \frac{(p_a - p_b)}{(Bw_a - Bw_b)}$$

$$v_{est} = \frac{c}{4 \cdot f_c \cdot T_{Mini}} \left( (p_a + p_b) - \frac{(p_a - p_b) \cdot (Bw_a + Bw_b)}{(Bw_a - Bw_b)} \right)$$

$$v_{est} \geq 0 \rightarrow n_{Over} = \left\lfloor (p_a + p_b) - \frac{(p_a - p_b) \cdot (Bw_a + Bw_b)}{(Bw_a - Bw_b)} \right\rfloor$$

$$v_{est} < 0 \rightarrow n_{Over} = \left\lceil (p_a + p_b) - \frac{(p_a - p_b) \cdot (Bw_a + Bw_b)}{(Bw_a - Bw_b)} \right\rceil.$$

Optionally, zero-padding fast Fourier transformation (FFT) may be used in each of the two-dimensional Fourier transformations to artificially increase the frequency resolution of the fast Fourier transformation in order to increase the accuracy of the initial range and velocity estimation.

The first duration $T_a$ and the second duration $T_b$ can in particular be equal. In this case, the signal processing in the detection process is simplified as setting both durations $T_a$, $T_b$ equal allows to obtain an overdetermined system of equations to calculate initial estimators of range R and velocity v with the information of the p-axis. It allows that the initial estimators will in general be closer to the final values of the range R and velocity v than if the durations $T_a$, $T_b$ are different. The solution of the iterative optimization algorithm will converge earlier.

Both initial estimators of the range $R_{est}$ and the velocity $v_{est}$ have remaining contributions of velocity and range, respectively. This means, that they are not completely decoupled yet. The correct decoupled velocity, or final value, is obtained by subtracting the effect of the correct range, and vice versa. Therefore, a final value of the range R and a final value of the velocity v can be determined using an iterative optimization algorithm with the initial estimators $R_{est}$, $V_{est}$ as seeds, like for example a least square algorithm. Thus, a least square algorithm can for example be used to determine the final values of the range R and the velocity v of the target object 1. The equations used in this iterative optimization algorithm are the following:

$$v_{corrA} = \left( n_{Over} + \frac{k_A}{N} - \left( \frac{2R_{est} \cdot \Delta f_a}{c} - \left\| \frac{2R_{est} \cdot \Delta f_a}{c} \right\| \right) \right) \cdot \frac{c}{2 \cdot f_c \cdot T_{Mini}}$$

$$v_{corrB} = \left( n_{Over} + \frac{k_b}{N} - \left( \frac{2R_{est} \cdot \Delta f_b}{c} - \left\| \frac{2R_{est} \cdot \Delta f_b}{c} \right\| \right) \right) \cdot \frac{c}{2 \cdot f_c \cdot T_{Mini}}$$

$$R_{corrA} = \frac{T_{Mini}}{\Delta f_a} \cdot \left( \frac{p_a \cdot c}{2T_{sam}} - 2v_{corrA} \cdot f_c \cdot L \right)$$

$$R_{corrB} = \frac{T_{Mini}}{\Delta f_b} \cdot \left( \frac{p_b \cdot c}{2T_{sam}} - 2v_{corrB} \cdot f_c \cdot L \right).$$

The corrected value of the velocity $v_{corr}$ is calculated from the position detected in the k-axis subtracting the contribution of the estimated range. The corrected value of the range $R_{corr}$ is calculated from the detected position in the p-axis subtracting the contribution of the estimated velocity. The corrected values are iteratively corrected every iteration.

Thus, the value of the initial estimator of the range ($R_{est}$) is used as the seed (variable) to be optimized in the iterative optimization algorithm. At every iteration, a small variation is introduced to $R_{est}$ and the correctness of the solution is evaluated with the cost function. The magnitude of the cost function evaluation defines the size of the variation introduced to the range estimator $R_{est}$ that will be introduced at the next iteration. As the corrected range and the corrected velocity obtained from both the first two-dimensional Fourier transformation and the second two-dimensional Fourier transformation should be the same, the cost function that the iterative optimization algorithm, for example a least squares algorithm, has to minimize is defined using the differences between the corrected values of the velocity and range at every iteration of both the first Fourier transformation and the second Fourier transformation:

$$f_{cost} = (v_{corrA} - v_{corrB}) \cdot (R_{corrA} - R_{corrB}).$$

Depending on the computational power resources and the real-time needs, the conversions tolerance $\epsilon_{con}$ of the cost function and the maximum number of iterations $n_{iter}$ to converge are selected. The maximum value of the cost function $f_{cost}$ which leads to a finalization of the iterative optimization algorithm with successful convergence. Assuming the value of the cost function at the n-th iteration $f_{cost(n)}$:

$f_{cost(n)} \leq \epsilon_{con} \rightarrow$ Solution has converged at the $n$-th iteration.

Being the maximum number of iterations $n_{iter}$, the maximum number of iterations allowed to be done until the convergence of the algorithm is achieved. If the number of iterations exceeds this maximum number of iterations $n_{iter}$, the iterative optimization process will finalize without successful convergence.

Figure 3:
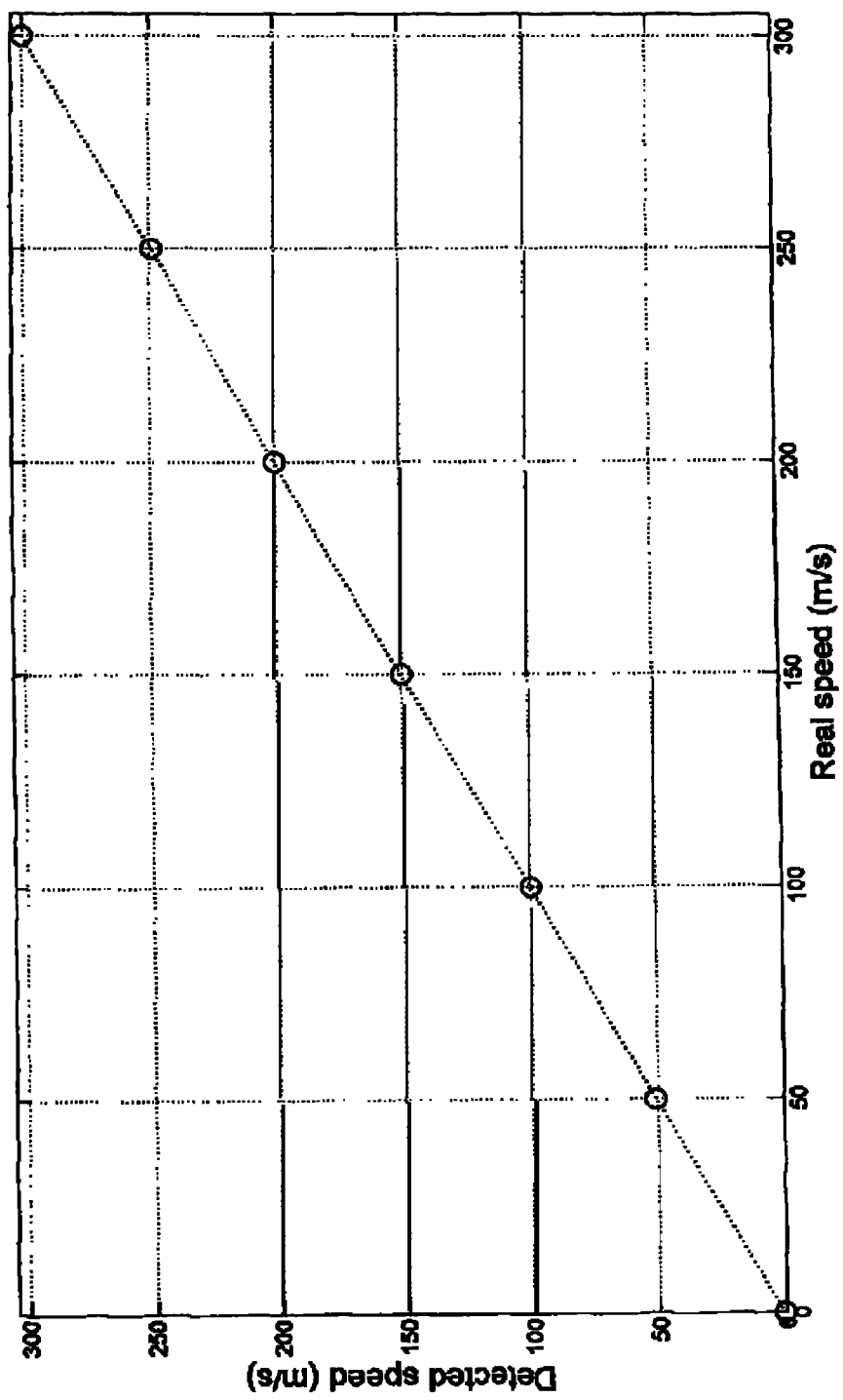
FIG. 3 shows a diagram showing the detections of a target object with increasing speed using the FMCW transmission signal of FIG. 2.
Figure 4:
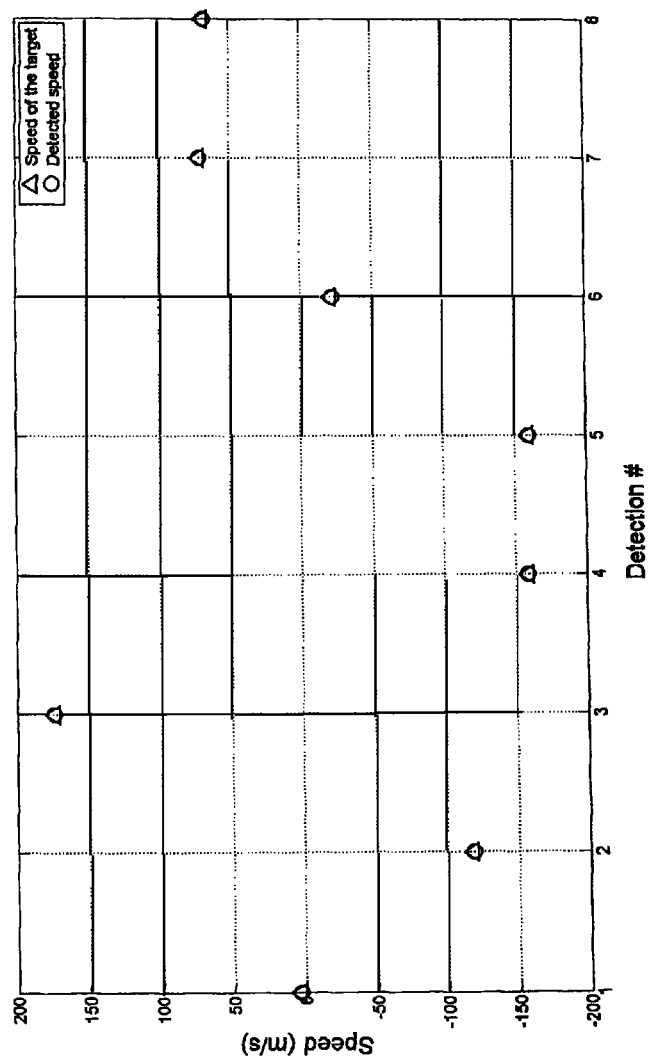
FIG. 4 shows a diagram showing multiple detections of the target object with random speed using the FMCW transmission signal of FIG. 2.
Figure 6:
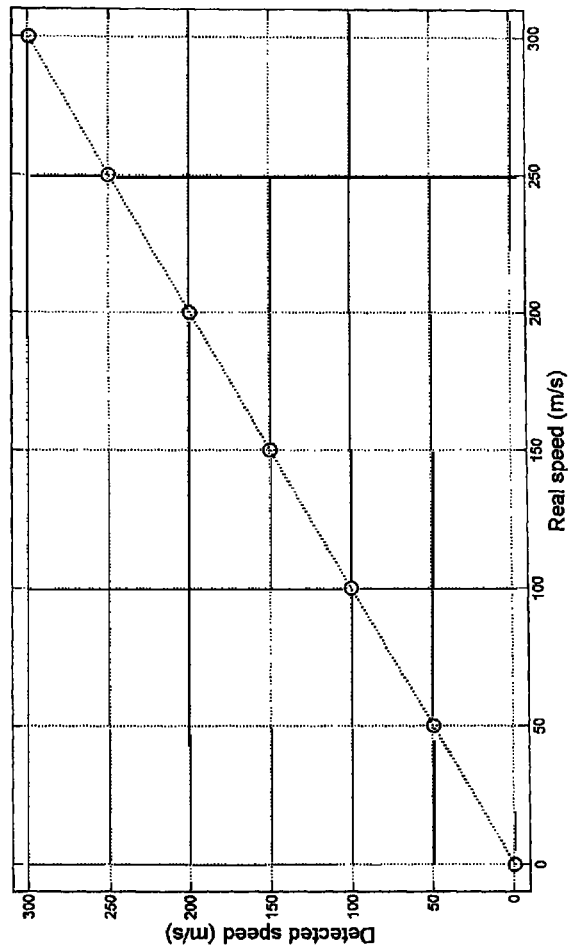
Figure 7:
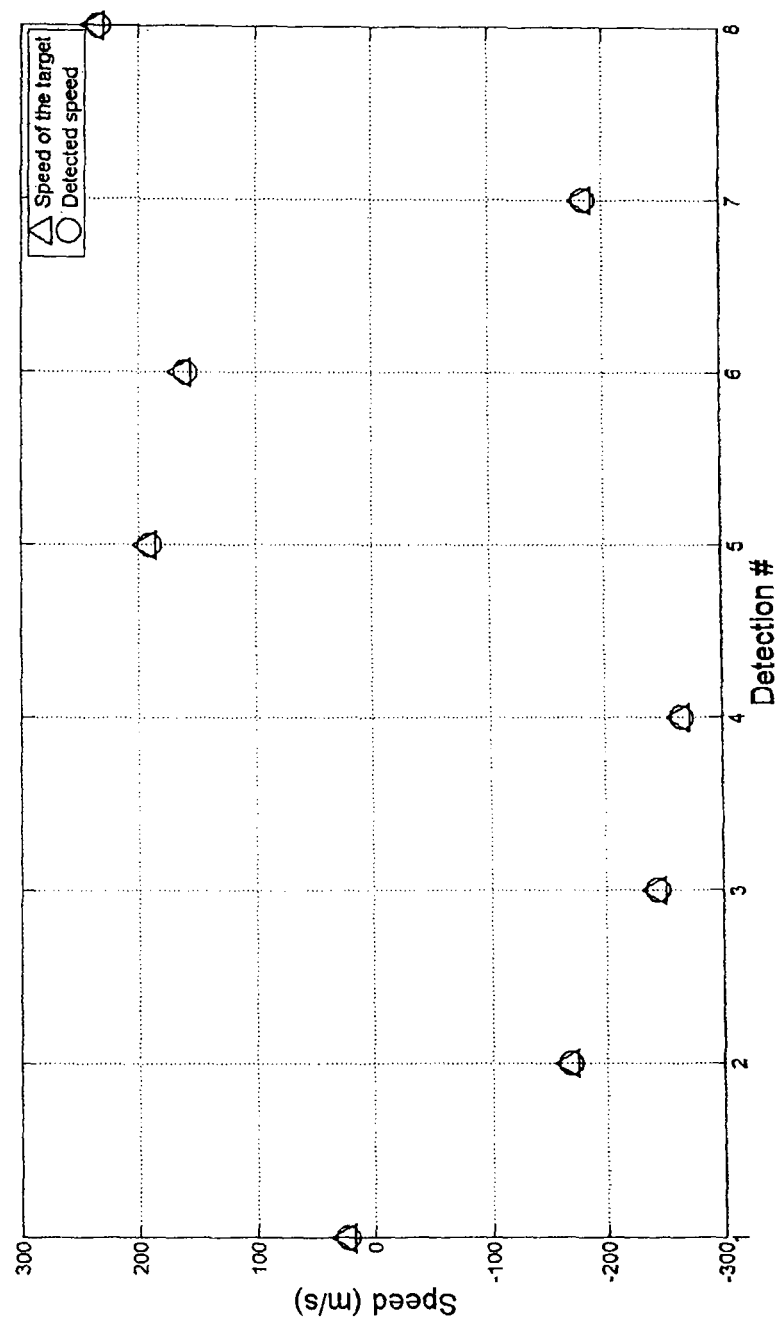

FIG. 3, FIG. 4, FIG. 6 and FIG. 7 show diagrams of detections performed in a computer simulation simulating the system and methods described above. FIG. 3 shows a diagram showing the detections of a target with linearly increasing velocity (speed) using the FMCW transmission signal of FIG. 2 and FIG. 4 shows a diagram showing the multiple detections of a target object with randomly selected velocity (speed) using the FMCW transmission signal of FIG. 2. FIG. 6 shows a diagram showing the detections of a target with linearly increasing velocity (speed) using the FMCW transmission signal of FIG. 5 or FIG. 5a and FIG. 7 shows a diagram showing multiple detections of the target with randomly selected velocity (speed) using the FMCW transmission signal of FIG. 5 or FIG. 5a. When the FMCW transmission signal of FIG. 5 is used, the last $N'_a$-$N'_b$ second type chirps ($N'_a$ being the number of first type chirps used for signal processing, $N'_b$ being the number of second type chirps used for signal processing) are not used for the signal processing. Thus, only a part of the transmitted second type chirps is used for signal processing. When the FMCW transmission signal of FIG. 5a is used, the last $N_a$-$N_b$ second type chirps are not transmitted. The number $N_a$ of first type chirps and the number of second type chirps $N_b$ are not the same number ($N_a$ being bigger than $N_b$). They are primes between them. However, when the FMCW transmission signal of FIG. 5a is used, all of the second type chirps (and the first type chirps) that are transmitted are also used for the signal processing.

In FIG. 3 and FIG. 6, the velocity of the target object ranges from 0 to 300 m/s. In FIG. 3 and FIG. 4, the target object is located at a range of 50 m. In FIG. 6 and FIG. 7, the target object is located at a range of 200 m. In FIG. 4 and FIG. 7, the x-axis shows multiple detections, each at a random velocity. The parameters of the FMCW transmission signal for FIG. 3 and FIG. 4 are the following: $N_a$=51, $N_b$=53, $T_a$=0.1 ms, $T_b$=0.1 MS, $f_c$=94 GHz, $Bw_M$=2 GHz, $Bw_a$=56.5 MHz, $Bw_b$=58.8 MHz, $\Delta f_a$=18.8 MHz, $\Delta f_b$=18.1 MHz. The parameters of the FMCW transmission signal for FIG. 6 and FIG. 7 are the following: $N_a$=53 (or $N'_a$=53 for the FMCW transmission signal of FIG. 5), $N_b$=51 (or $N'_b$=51 for the FMCW transmission signal of FIG. 5), $T_a$=0.1 ms, $T_b$=0.1 ms, $f_c$=94 GHz, $Bw_M$=2 GHz, $Bw_a$=71.4 MHz, $Bw_b$=34.4 MHz, $\Delta f$=37.1 MHz. For both the first embodiment (FIG. 3 and FIG. 4) and the second embodiment (FIG. 6 and FIG. 7) of the FMCW transmission signal, the total error of the detected velocity is under 1%.

A corresponding object detection method for determining range R and velocity v of a target object 1 comprises the step of generating the FMCW transmission signal Tx as explained above. The method further comprises the step of processing a mixed signal based on the transmission signal Tx and the reception signal Rx and using the first type chirps and the second type chirps, in order to determine the range R and velocity v of the target object 1. The step of processing can comprise separating from the mixed signal a first signal component corresponding to the first type chirps and a second signal component corresponding to the second type chirps. It can further comprise processing the first signal component and the second component independently from each other. Also, the step can comprise initial estimators of the range and velocity by joining the information obtained from processing both signal components. These initial estimators can be seeds in an iterative optimization algorithm used to determine the final values of the range R and the velocity v of the target object.

The object detection system and method described above can in particular implement an algorithm for optimizing the transmission signal, or also called waveform optimizing algorithm. The signal generator 11 in FIG. 1 is then adapted to amend at least one parameter of the FMCW transmission signal Tx. The at least one parameter can be selected from the group consisting of:
  duration of a first type chirp $T_a$,
  duration of a second type chirp $T_b$, $T_{Mini}$,
  bandwidth of a first type chirp $Bw_a$,
  bandwidth of a second type chirp $Bw_b$,
  frequency offset $\Delta f$, $\Delta f_a$, $\Delta f_b$,
  number of first type chirps $N_b$, and
  number of second type chirps $N_a$.

As can be seen in the embodiment of FIG. 1, the object detection system 10 optionally further comprises a parameter optimizing unit 18 adapted to optimize the at least one parameter of the FMCW transmission signal $T_x$. In particular, the parameter optimizing unit 18 can optimize the at least one parameter based on the detected range R and detected velocity v received from the signal processing unit 12. However, alternatively or cumulatively, the at least one parameter of the FMCW transmission signal $T_x$ can also be optimized using other parameters of the environment. For example, the at least one parameter of the FMCW transmission signal $T_x$ can be optimized using at least one of the following parameters:
  Parameters defining the scanned environment:
    Furthest detected target ($D_{MAX}$).
    Maximum velocity detected ($V_{MAX}$).
  RF parameters of the system:
    Maximum bandwidth available ($BW_{MAX}$).
    Maximum chirp rate specified ($CH_{MAX}$).
    Central frequency of the radar ($F_C$).
  Parameters to be defined by the user:
    Coarsest range resolution to be kept ($R_{RES}$).
    Coarsest velocity resolution to be kept ($V_{RES}$).
    Maximum unambiguous velocity to be always kept ($V_{MiniMax}$).
    Maximum distance expected to be detected ($DEXP_{MAX}$).
    Maximum acceleration/deceleration expected ($ACC_{MAX}$).
    Environment sensing period ($T_{SENS}$).
    Maximum unambiguous velocity detectable tolerance factor ($V_{TOL}$).
    Furthest detected range tolerance factor ($D_{TOL}$).
  Parameters of the modulation scheme to be adjusted by the algorithm:
    Duration of a first type chirp or a second type chirp ($T_a$, $T_b$).
    Repetition factor for every chirp type ($N_a$, $N_b$,).
    Bandwidth of every chirp type ($Bw_a$, $Bw_b$)
    Frequency offset of every chirp type ($f_a$, $f_b$)

Figure 8:
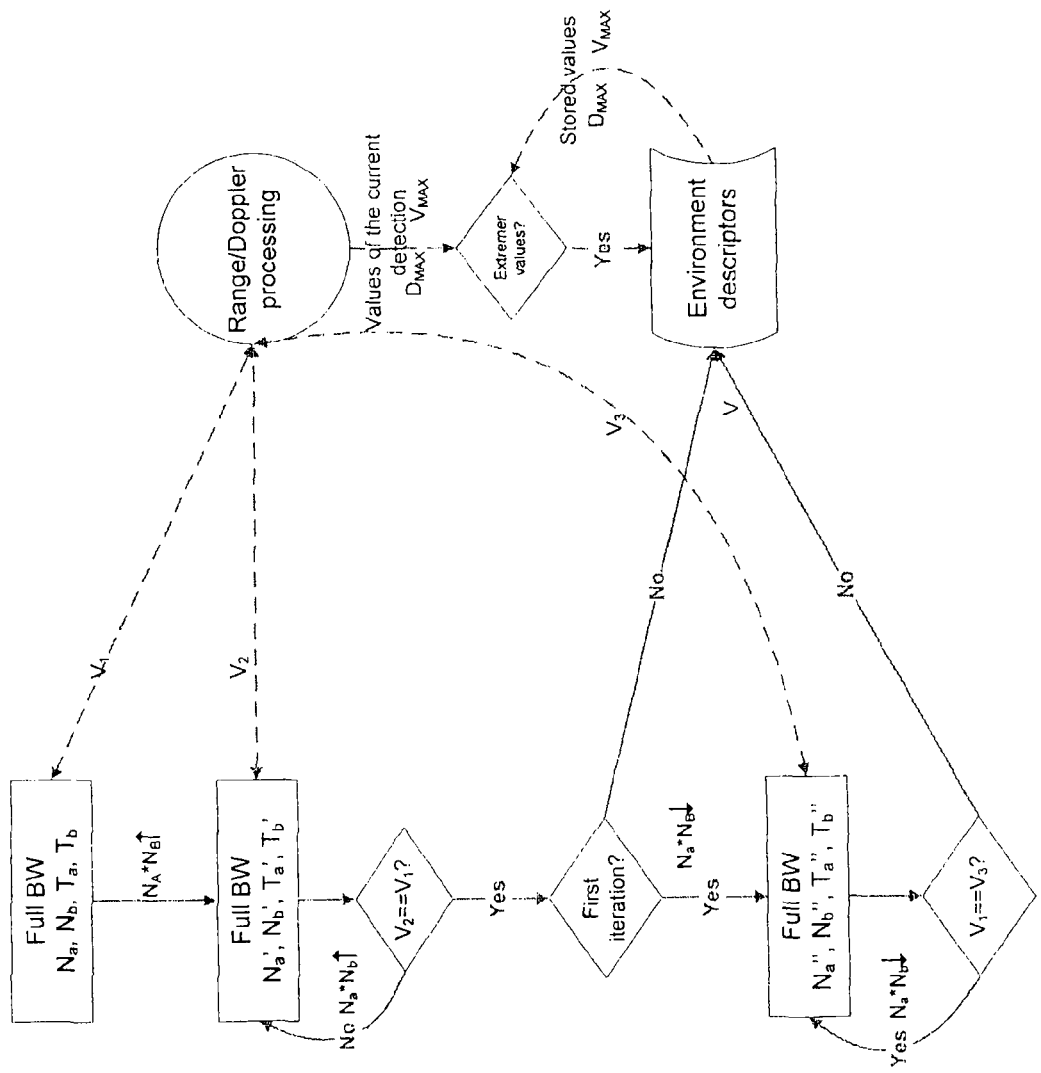
FIG. 8 shows a flowchart of an algorithm for optimizing the transmission signal.

An algorithm to sense the environment to be detected (sensing environment algorithm) can be implemented by the parameter optimizing unit. The objective of this sensing environment algorithm is to detect what are the parameters that define the environment. The sensing process is done by varying the waveform of the transmission signal Tx sequentially in order to increase successively the maximum unambiguous detectable velocity with the two chirp types used. In case a different velocity is estimated with two consecutive estimations, another estimation increasing the factors $N_a$ and $N_b$ (next combination of prime numbers, $N_a$ and $N_b$, that increases the product $N_a*N_b$, $N_a$ being bigger than $N_b$) is performed, the process is repeated until the same velocity is estimated with two consecutive estimations. $T_a$ and $T_b$ are adjusted to be at least ten times higher than the delay that would be produced by the maximum distance expected to be detected ($DEXP_{MAX}$). A flowchart of an embodiment of the sensing environment algorithm is depicted in FIG. 8.

The sensing environment algorithm is called from the parameter optimizing unit 18 for two different reasons: Periodically, which means that every $T_{SENS}$ the algorithm is called by the parameter optimizing unit 18 to update the parameters that define the sensed environment, or if a sudden variation of the velocity of a target is detected, which corresponds to a higher acceleration than the maximum which is being expected ($ACC_{MAX}$), as it could be produced by a target with higher radial velocity than the maximum unambiguously detectable velocity with the current combination of chirp types.

Once the sensing environment is applied, the at least one parameter of the FMCW transmission signal can be adjusted taken into account the sensed environment, the parameters defined by the user and/or the RF parameters of the system. The durations of the first type chirp or second type chirp $T_a$, $T_b$ and the repetition factors $N_a$, $N_b$ are adjusted taking into account at least one of the following values: maximum unambiguous velocity to be detected, coarsest velocity resolution to be kept defined by the user ($V_{RES}$), furthest target to be detected, maximum chirp rate specified ($CH_{MAX}$). The maximum unambiguous velocity to be detected is defined by the maximum value between the maximum unambiguous velocity to be always kept ($V_{MiniMax}$), defined by the user, and the product of the maximum velocity detected by the sensing algorithm and the tolerance factor defined by the user ($V_{MAX}* V_{TOL}$). The furthest target to be detected is defined by the maximum value between the distance expected to be detected ($DEXP_{MAX}$), defined by the user, and the product of the furthest detected target by the sensing algorithm and the tolerance factor defined by the user ($D_{MAX}* D_{TOL}$). Additionally, the parameter optimizing unit 18 can apply small random variations to $Bw_a$ and $Bw_b$ (and indirectly to $f_a$ and $f_b$) if in a certain number of modulations blocks (pre-defined by the user) more than one valid permutation is found in one tolerance region.

The sensing environment algorithm and waveform optimizing algorithm can be also used in a multistatic radar network by adapting the waveform parameters for each transceiver depending on the radial velocity and range detected at every element of the network.

The complexity of the algorithm can be increased to deal with dynamic RF specifications. In case the maximum chirp rate is not specified but a varying phase noise skirts depending on the chirp rate is provided. The selection of the chirp rate to be used is then decided by weighting between the benefits and drawbacks of chirping at a faster rate. The benefit can be in terms of Doppler detection (higher unambiguous velocity can be detected). The drawback can be that a more pronounced chirp rate relates to a higher phase noise skirt.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An object detection system for determining a range and a velocity of a target object by transmitting a frequency modulated continuous wave (FMCW) transmission signal and receiving transmission signal reflections of the FMCW transmission signal from the target object as a reception signal, the system comprising:
   a signal generator configured to generate the FMCW transmission signal, the FMCW transmission signal having multiple consecutive modulation blocks, each modulation block comprising:
      a number of first type chirps, each first type chirp having a first slope; and
      a number of second type chirps, each second type chirp having a second slope different from the first slope, wherein:
         two consecutive chirps of a same type have a frequency offset,
         the number of second type chirps is less than the number of first type chirps, and
         each of the second type chirps directly follows one of the first type chirps, such that at least two first type chirps are not directly followed by a second type chirp; and
   signal processing circuitry configured to process a mixed signal based on the FMCW transmission signal and the reception signal and to use the first type chirps and the second type chirps to determine the range of the target object and the velocity of the target object.

2. The object detection system of claim 1, wherein the first slope is positive and the second slope is negative.

3. The object detection system of claim 2, wherein a portion of the modulation block includes a repeating sequence of the first type chirp directly followed by the second type chirp, thereby forming a plurality of triangles.

4. The object detection system of claim 1, further comprising sampling circuitry configured to sample the mixed signal with a sampling period.

5. The object detection system of claim 4, wherein a first duration of each of the first type chirps is bigger than the sampling period, and a second duration of each of the second type chirps is bigger than the sampling period.

6. The object detection system of claim 1, wherein:
   each of the first type chirps has a first frequency bandwidth and a first duration, a ratio of the first frequency bandwidth and the first duration defining the first slope, and
   each of the second type chirps has a second frequency bandwidth and a second duration, a ratio of the second frequency bandwidth and the second duration defining the second slope.

7. The object detection system of claim 6, wherein the first duration and the second duration are equal.

8. The object detection system of claim 6, wherein the FMCW transmission signal covers a full frequency bandwidth over each block period, and wherein each of the first frequency bandwidth and the second frequency bandwidth is a sub-range of the full frequency bandwidth.

9. The object detection system of claim 1, wherein the modulation blocks are identical to each other, and each of the modulation blocks has a block period.

10. The object detection system of claim 1, wherein the number of first type chirps and the number of second type chirps are primes between them.

11. The object detection system of claim 1, wherein the signal processing circuitry is configured to separate from the mixed signal a first signal component corresponding to the first type chirps and a second signal component corresponding to the second type chirps.

12. The object detection system of claim 11, wherein the signal processing circuitry is configured to process the first signal component and the second signal component independently from each other.

13. The object detection system of claim 11, wherein the signal processing circuitry is configured to apply a first two-dimensional Fourier Transformation to the first signal component and a second two-dimensional Fourier Transformation to the second signal component.

14. The object detection system of claim 13, wherein a first peak corresponding to the target object is detected in the first two-dimensional Fourier Transformation, and a second peak corresponding to the target object is detected in the second two-dimensional Fourier Transformation.

15. The object detection system of claim 11, wherein the signal processing circuitry is configured to determine an initial estimator of the range of the target object and an initial estimator of the velocity of the target object by joining the information obtained from processing the first signal component and the second signal component.

16. The object detection system of claim 15, wherein the initial estimator of the range of the target object and the initial estimator of the velocity of the target object are determined using a first peak ($p_a$) and a second peak ($p_b$).

17. The object detection system of claim 16, wherein the initial estimator of the range ($R_{est}$) and the initial estimator of the velocity ($V_{est}$) are determined using the following formulas:

$$R_{est} = \frac{c}{2} \frac{(p_a - p_b)}{(Bw_a - Bw_b)}$$

$$v_{est} = \frac{c}{4 \cdot f_c \cdot T_{Mini}} \left( (p_a + p_b) - \frac{(p_a - p_b) \cdot (Bw_a + Bw_b)}{(Bw_a - Bw_b)} \right),$$

wherein c re represents speed of light; $p_a$ represents the first peak; $p_b$ represents the second peak; $Bw_a$ represents a bandwidth of a first type chirp; $Bw_b$ represents a bandwidth of a second type chirp; $f_c$ represents a central frequency; and $T_{mini}$ represents a period of a first type chirp or second type chirp.

18. The object detection system of claim 15, wherein the signal processing circuitry is configured to determine a final value of the range of the target object and a final value of the velocity of the target object using an iterative optimization algorithm with the initial estimator of the range and the initial estimator of the velocity as seeds.

19. The object detection system of claim 1, wherein the signal generator is configured to amend at least one parameter of the FMCW transmission signal.

20. The object detection system of claim 19, wherein the at least one parameter is selected from the group consisting of a duration of the first type chirp, a duration of the second type chirp, a first bandwidth, a second bandwidth, the frequency offset, the number of first type chirps, and the number of second type chirps.

21. The object detection system of claim 19, further comprising:
parameter optimizing circuitry configured to optimize the at least one parameter of the FMCW transmission signal.

22. An object detection method for determining a range and a velocity of a target object by transmitting a frequency modulated continuous wave (FMCW) transmission signal and receiving transmission signal reflections of the FMCW transmission signal from the target object as a reception signal, the method comprising the steps of:
generating the FMCW transmission signal, the FMCW transmission signal having multiple consecutive modulation blocks, each modulation block comprising:
a number of first type chirps, each first type chirp having a first slope, and
a number of second type chirps, each second type chirp having a second slope different from the first slope, wherein:
two consecutive chirps of a same type have a frequency offset,
the number of second type chirps is less than the number of first type chirps, and
each of the second type chirps directly follows one of the first type chirps, such that at least two first type chirps are not directly followed by a second type chirp; and
processing a mixed signal based on the FMCW transmission signal and the reception signal, and using the first type chirps and the second type chirps to determine the range of the target object and velocity of the target object.

23. A non-transitory computer readable medium having instructions stored thereon which, when carried out on a computer, cause the computer to perform an object detection method for determining a range and a velocity of a target object by transmitting a frequency modulated continuous wave (FMCW) transmission signal and receiving transmission signal reflections of the FMCW transmission signal from the target object as a reception signal, the method comprising the steps of:
generating the FMCW transmission signal, the FMCW transmission signal having multiple consecutive modulation blocks, each modulation block comprising:
a number of first type chirps, each first type chirp having a first slope,
a number of second type chirps, each second type chirp having a second slope different from the first slope, wherein:
two consecutive chirps of a same type have a frequency offset,
the number of second type chirps is less than the number of first type chirps, and
each of the second type chirps directly follows one of the first type chirps, such that at least two first type chirps are not directly followed by a second type chirp; and
processing a mixed signal based on the FMCW transmission signal and the reception signal, and using the first type chirps and the second type chirps to determine the range of the target object and velocity of the target object.

* * * * *